US012570541B1

(12) United States Patent  (10) Patent No.:  US 12,570,541 B1
Abdulkhair et al.  (45) Date of Patent:  Mar. 10, 2026

(54) MULTIPHASE NANOCOMPOSITE MATERIAL PRODUCTION

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/098,466

(22) Filed: Apr. 2, 2025

(51) Int. Cl.
*C01G 49/00*  (2006.01)
*B82Y 30/00*  (2011.01)
*C01B 33/113*  (2006.01)

(52) U.S. Cl.
CPC .......... *C01G 49/0063* (2013.01); *B82Y 30/00* (2013.01); *C01B 33/113* (2013.01);
(Continued)

(58) Field of Classification Search
None
See application file for complete search history.

(56)  References Cited

U.S. PATENT DOCUMENTS

| | | | |
|---|---|---|---|
| 10,201,916 B2 * | 2/2019 | Kodas | ...................... B29B 9/12 |
| 2007/0178163 A1 * | 8/2007 | Kodas | ................. B01J 13/0047 |
| | | | 977/900 |
| 2007/0290384 A1 * | 12/2007 | Kodas | ................. B01J 13/0095 |
| | | | 977/900 |

FOREIGN PATENT DOCUMENTS

| | | |
|---|---|---|
| CN | 103232043 A | 8/2013 |
| CN | 105435745 A | 3/2016 |

(Continued)

OTHER PUBLICATIONS

Lu et al.; Hierarchical structured ZnFe2O4@SiO2@TiO2 composite for enhanced visible-light photocatalytic activity; Journal of Alloys and Compounds; vol. 761, pp. 15-23 Sep. 15, 2018.*

(Continued)

*Primary Examiner* — Guinever S Gregorio
(74) *Attorney, Agent, or Firm* — Oblon, McClelland, Maier & Neustadt, L.L.P.

(57)  ABSTRACT

A rhombohedral $Zn_2SiO_4$/cubic $ZnFe_2O_4$/hexagonal $SiO_2$/C nanocomposite material includes a rhombohedral zinc orthosilicate ($Zn_2SiO_4$) phase, a cubic zinc ferrite ($ZnFe_2O_4$) phase, and a hexagonal silicon dioxide ($SiO_2$) phase. The rhombohedral $Zn_2SiO_4$/cubic $ZnFe_2O_4$/hexagonal $SiO_2$/C nanocomposite material exhibits a morphology including (Continued)

spherical microscale particles with an average diameter ranging from 0.8 micrometer (μm) to 1.8 μm and irregular nanoscale aggregates with an average diameter ranging from 50 nanometer (nm) to 110 nm. The rhombohedral $Zn_2SiO_4$/ cubic $ZnFe_2O_4$/hexagonal $SiO_2$/C nanocomposite material has an adsorption capacity for basic fuchsin dye of greater than or equal to 140 milligrams per gram (mg/g). Furthermore, a method for producing the rhombohedral $Zn_2SiO_4$/ cubic $ZnFe_2O_4$/hexagonal $SiO_2$/C nanocomposite material includes calcination of metal precursors.

19 Claims, 9 Drawing Sheets

(52) U.S. Cl.
     CPC ...... *C01P 2002/60* (2013.01); *C01P 2002/74* (2013.01); *C01P 2002/76* (2013.01); *C01P 2002/85* (2013.01); *C01P 2004/03* (2013.01); *C01P 2004/04* (2013.01); *C01P 2004/32* (2013.01); *C01P 2004/45* (2013.01); *C01P 2004/61* (2013.01); *C01P 2004/62* (2013.01); *C01P 2004/64* (2013.01)

(56) References Cited

FOREIGN PATENT DOCUMENTS

| CN | 112048194 A | 12/2020 |
| CN | 109876815 B | 4/2022 |
| CN | 115007130 A | 9/2022 |

OTHER PUBLICATIONS

Chen et al.; Converting industrial waste into valuable Zn2SiO4/SiO2 nanosheets for highly effective organic dye removal; Sustainable Materials and Technologies; vol. 39, Apr. 2024.*

Ai et al.; translation CN 109876815; Published Apr. 2022.*

Mingliang Ma, et al., "NiCo2O4 nanosheets decorated on one-dimensional ZnFe2O4@SiO2@C nanochains with high-performance microwave absorption", Journal of Colloid and Interface Science, vol. 578, 2020, pp. 58-68, 11 Pages.

Daohui Li, et al. "Converting industrial waste into valuable Zn2SiO4/SiO2 nanosheets for highly effective organic dye removal", Sustainable Materials and Technologies, vol. 39, Apr. 2024, 8 Pages.

Daohui Li, et al. "Sustainable Materials and Technologies Converting Industrial Waste into Valuable Zn2SiO4/SiO2 Nanosheets for Highly Effective Organic Dye Removal",—Manuscript Draft—, Powered by Editorial Manager® and ProduXion Manager® from Aries Systems Corporation, https://doi.org/10.1016/j.susmat.2024.e00834, 34 Pages.

* cited by examiner

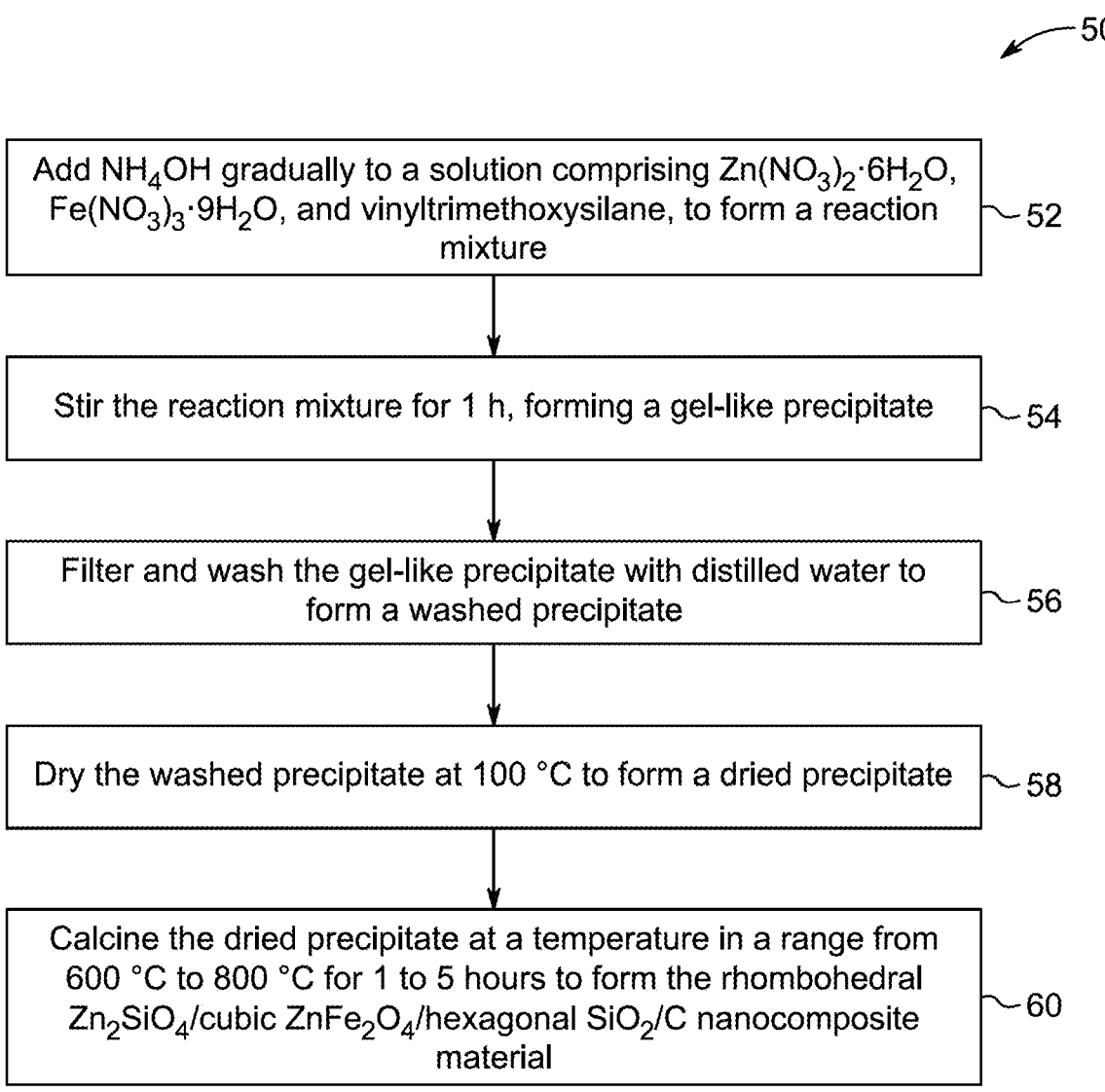

50

Add NH$_4$OH gradually to a solution comprising Zn(NO$_3$)$_2$·6H$_2$O, Fe(NO$_3$)$_3$·9H$_2$O, and vinyltrimethoxysilane, to form a reaction mixture ~ 52

Stir the reaction mixture for 1 h, forming a gel-like precipitate ~ 54

Filter and wash the gel-like precipitate with distilled water to form a washed precipitate ~ 56

Dry the washed precipitate at 100 °C to form a dried precipitate ~ 58

Calcine the dried precipitate at a temperature in a range from 600 °C to 800 °C for 1 to 5 hours to form the rhombohedral Zn$_2$SiO$_4$/cubic ZnFe$_2$O$_4$/hexagonal SiO$_2$/C nanocomposite material ~ 60

MULTIPHASE NANOCOMPOSITE MATERIAL PRODUCTION

BACKGROUND

Technical Field

The present disclosure is directed towards a nanocomposite material, and more particularly, relates to a multiphase rhombohedral $Zn_2SiO_4$/cubic $ZnFe_2O_4$/hexagonal $SiO_2$/C nanocomposite material and a method of preparation thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Nanomaterials are typically characterized by having at least one dimension in the nanoscale range (1-1000 nm). Their size-dependent characteristics including altered melting points, magnetism, electrical conductivity, and catalytic efficiency, have enabled applications in optoelectronics, ceramics, sensors, semiconductors, and medical treatments. However, the high cost and stringent synthesis conditions of nanomaterials have limited their large-scale implementation. To mitigate these challenges, researchers have developed nanocomposites, incorporating nanomaterials as functional additives to enhance performance while reducing costs.

Various synthesis techniques has been explored to fabricate nanomaterials and nanostructures with distinct properties and variations. Conventional approaches provide precise control over particle size and composition but often suffer from low yield, high energy consumption, and limited scalability. Physical methods, including laser ablation and mechanical milling, enable large-scale production but frequently result in broad particle size distributions and agglomeration. Meanwhile, chemical methods, such as co-precipitation and colloidal synthesis, offer tunability but require rigorous control over reaction conditions to prevent aggregation. The fabrication of nanocomposites using these methods is further complicated by the challenges in nanoparticle dispersion, matrix compatibility, and interfacial adhesion, all of which impact their mechanical, electrical, and thermal properties.

The urgent need for sustainable solutions has driven extensive research into the application of nanomaterials for resolving environmental and energy-related challenges. For instance, organic dyes, widely used in textiles, rubber, varnishes, and pesticides, have become a major source of water pollution. Untreated dye effluents disrupt aquatic ecosystems, bioaccumulate in living organisms, and pose severe health risks, including carcinogenic effects. Various dye removal techniques, such as adsorption, chemical coagulation, electrolysis, and biodegradation, have been developed to mitigate pollution. Among them, adsorption is the most effective due to its cost efficiency, ease of operation, and high removal efficiency. However, conventional adsorbents suffered from limited regeneration capacity and low adsorption rates, necessitating the development of advanced nanomaterial-based adsorbents with enhanced surface area and functionalization.

Another area of nanomaterials research is the development of polymer-based nanocomposites. The depletion of petroleum resources and the environmental concerns surrounding non-biodegradable polymers have prompted the exploration of biodegradable and renewable polymer composites. Incorporating nanostructures into polymer matrices improves mechanical strength, electrical conductivity, and optical properties. Nanoscale fillers, such as nanocarbons, nanoclays, and metallic nanoparticles, establish percolative networks within polymer matrices, enhancing charge transport, thermal stability, and mechanical reinforcement. However, poor nanoparticle dispersion, strong molecular interactions, and weak interfacial adhesion repeatedly limited the overall performance of these composites. Effective dispersion strategies, including surface functionalization and advanced mixing techniques, optimize composite properties.

Despite the remarkable potential of nanomaterials, existing synthesis and fabrication methods often suffer from low efficiency, scalability issues, and high production costs. The development of multiphase nanomaterials shows a breakthrough in nanotechnology. These materials integrate multiple functional phases within a single nanostructure, offering enhanced stability, reactivity, and multifunctionality. Various nanophases within a single nanostructure can simultaneously optimize adsorption, mass transport, and catalytic performance for next-generation nanomaterial development. Therefore, solving these challenges will enable the widespread adoption of nanomaterials in relevant applications, driving progress in sustainable energy solutions, environmental protection, and biomedical innovations.

Accordingly, one object of the present disclosure is to provide a rhombohedral nanocomposite material and method of preparation thereof, that may circumvent the above listed drawbacks and limitations of the materials and methods already known in the art.

SUMMARY

In an exemplary embodiment, a rhombohedral $Zn_2SiO_4$/cubic $ZnFe_2O_4$/hexagonal $SiO_2$/C nanocomposite material is described. The nanocomposite material includes a rhombohedral zinc orthosilicate ($Zn_2SiO_4$) phase, a cubic zinc ferrite ($ZnFe_2O_4$) phase, and a hexagonal silicon dioxide ($SiO_2$) phase. The rhombohedral $Zn_2SiO_4$/cubic $ZnFe_2O_4$/hexagonal $SiO_2$/C nanocomposite material has a morphology including spherical microscale particles with an average diameter in a range from 0.8 micrometer ($\mu$m) to 1.8 $\mu$m and irregular nanoscale aggregates with an average diameter in a range from 50 nanometer (nm) to 110 nm. Further, the rhombohedral $Zn_2SiO_4$/cubic $ZnFe_2O_4$/hexagonal $SiO_2$/C nanocomposite material has an adsorption capacity for basic fuchsin dye of greater than or equal to 140 milligrams per gram (mg/g).

In some embodiments, the spherical microscale particles with an average diameter in a range from 1 $\mu$m to 1.5 $\mu$m.

In some embodiments, the spherical microscale particles with an average diameter in a range from 1.1 $\mu$m to 1.3 $\mu$m.

In some embodiments, the irregular nanoscale aggregates with an average diameter in a range from 60 nm to 100 nm.

In some embodiments, the irregular nanoscale aggregates with an average diameter in a range from 70 nm to 90 nm.

In some embodiments, the oxygen content is in a range from 40 atomic percent (at. %) to 60 at. %, the silicon content is in a range from 20 at. % to 30 at. %, the zinc content is in a range from 8 at. % to 18 at. %, the iron content is in a range from 5 at. % to 10 at. %, and the carbon content is in a range from 0.5 at. % to 10 at. %.

In some embodiments, the oxygen content is in a range from 45 at. % to 55 at. %, the silicon content is in a range from 22 at. % to 27 at. %, the zinc content is in a range from 10 at. % to 15 at. %, the iron content is in a range from 6 at. % to 9 at. %, and the carbon content is in a range from 2 at. % to 8 at. %.

In some embodiments, the rhombohedral $Zn_2SiO_4$/cubic $ZnFe_2O_4$/hexagonal $SiO_2$/C nanocomposite material has an average crystallite size in a range from 50 nm to 70 nm. In some embodiments, the rhombohedral $Zn_2SiO_4$/cubic $ZnFe_2O_4$/hexagonal $SiO_2$/C nanocomposite material has an average crystallite size in a range from 55 nm to 65 nm. In some embodiments, the rhombohedral $Zn_2SiO_4$/cubic $ZnFe_2O_4$/hexagonal $SiO_2$/C nanocomposite material has an adsorption capacity for basic fuchsin dye of greater than or equal to 150 mg/g.

In some embodiments, rhombohedral $Zn_2SiO_4$/cubic $ZnFe_2O_4$/hexagonal $SiO_2$/C nanocomposite material has an adsorption capacity for basic fuchsin dye of greater than or equal to 155 mg/g.

In an exemplary embodiment, a method of producing the rhombohedral $Zn_2SiO_4$/cubic $ZnFe_2O_4$/hexagonal $SiO_2$/C nanocomposite material is described. The method includes adding ammonium hydroxide ($NH_4OH$) gradually to a solution including zinc nitrate hexahydrate ($Zn(NO_3)_2 \cdot 6H_2O$), ferric nitrate nonahydrate ($Fe(NO_3)_3 \cdot 9H_2O$), and vinyltrimethoxysilane, forming a reaction mixture. Further, stirring the reaction mixture for 1 hour, and forming a gel-like precipitate. The method further includes filtering and washing the gel-like precipitate with distilled water to form a washed precipitate. The method further includes drying the washed precipitate at 100° C. to form a dried precipitate and calcining the dried precipitate at a temperature in a range from 600° C. to 800° C. for 1 hour to 5 hours to form the rhombohedral $Zn_2SiO_4$/cubic $ZnFe_2O_4$/hexagonal $SiO_2$/C nanocomposite material.

In some embodiments, the concentration of $NH_4OH$ in the reaction mixture is in a range from 50 ml/L to 70 ml/L.

In some embodiments, the concentration of $Zn(NO_3)_2 \cdot 6H_2O$ in the reaction mixture is in a range from 80 g/L to 100 g/L.

In some embodiments, the concentration of $Fe(NO_3)_3 \cdot 9H_2O$ in the reaction mixture is in a range from 110 g/L to 140 g/L.

In some embodiments, the concentration of vinyltrimethoxysilane in the reaction mixture is in a range from 300 ml/L to 500 ml/L.

In some embodiments, the dried precipitate is calcined at 650° C. to 750° C.

In some embodiments, the dried precipitate is calcined at 700° C.

In some embodiments, the dried precipitate is calcined for 2 hours to 4 hours.

In some embodiments, the dried precipitate is calcined for 3 hours.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1A illustrates an exemplary flow chart depicting a method for the production of rhombohedral $Zn_2SiO_4$/Cubic $ZnFe_2O_4$/hexagonal $SiO_2$/C nanocomposite (nanocomposite material), according to certain embodiments.

DETAILED DESCRIPTION

Figure 1B:
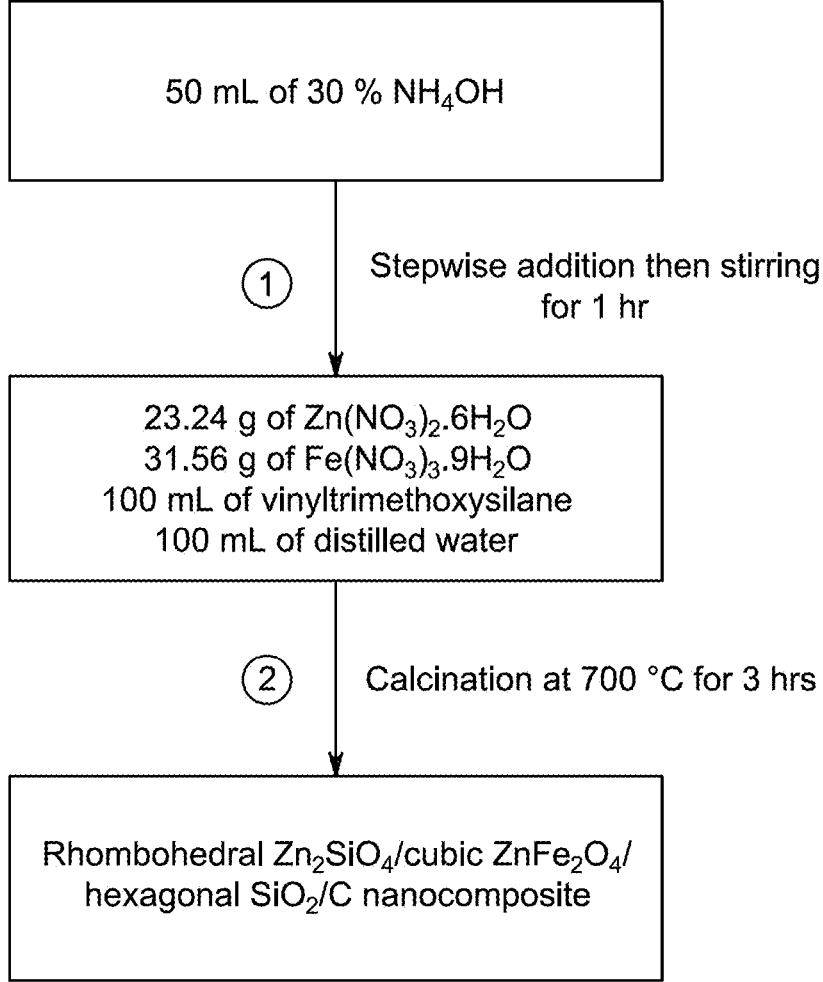
FIG. 1B is a schematic illustration depicting a method for the production of the nanocomposite material, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 1000 nm within the scope of the present disclosure.

As used herein, the term 'nanocomposite' refers to a composite material that has at least one component with a grain size measured in nanometers.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a parameter in characterizing the porous structure of materials, such as adsorbents or catalysts.

As used herein, the term 'average particle size' refers to the mean diameter of nanoparticles in a sample, typically calculated from measurements obtained using techniques such as scanning electron microscopy (SEM) or transmission electron microscopy (TEM), representing the typical size of the particles in the distribution.

As used herein, the term 'average crystallite size' refers to the mean size of crystalline regions in a material, typically determined through X-ray diffraction (XRD) analysis, and represents the size of the individual crystal domains within the sample, excluding any amorphous material.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

An aspect of the present disclosure is directed to a rhombohedral $Zn_2SiO_4$/cubic $ZnFe_2O_4$/hexagonal $SiO_2$/C nanocomposite (also referred to as a nanocomposite material) fabricated using a sol-gel process. The nanocomposite material of the present disclosure involves the controlled incorporation of multiple crystalline phases to achieve a material with enhanced structural properties and potential for diverse applications.

A rhombohedral $Zn_2SiO_4$/cubic $ZnFe_2O_4$/hexagonal $SiO_2$/C nanocomposite material is described. The nanocomposite material includes a rhombohedral $Zn_2SiO_4$ phase, a cubic $ZnFe_2O_4$ phase, and a hexagonal $SiO_2$ phase. The nanocomposite material includes a rhombohedral $Zn_2SiO_4$ phase, a cubic $ZnFe_2O_4$ phase, and a hexagonal $SiO_2$ phase. In some embodiments, the nanocomposite material may include crystalline phases, but is not limited to quartz, calcite, hematite, magnetite, goethite, dolomite, albite, anorthite, pyrite, fluorite, halite, barite, apatite, rutile, and zircon. The nanocomposite material has an average crystallite size in a range from 30 to 100 nm, preferably 50 to 70 nm, preferably 55 to 70 nm, preferably 60 to 70 nm, preferably 55 to 70 nm, preferably 55 to 65 nm. In a preferred embodiment, the nanocomposite has an average crystallite size of 58.82 nm.

In some embodiments, the nanocomposite material is porous. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

In some embodiments, in the nanocomposite material comprises sheet morphologies, including nanosheets, nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. In a preferred embodiment, nanocomposite material has a morphology including a combination of spherical microscale particles and irregularly shaped aggregates.

In some embodiments, the spherical microscale particles have an average particle diameter ranging from 0.3 to 2.5 μm, preferably 0.8 to 1.8 μm, preferably 1 to 1.5 μm, preferably 1.1 to 1.5 μm, preferably 1.1 to 1.3 μm. In a preferred embodiment, the spherical microscale particles have an average particle diameter of 1.19 μm.

In some embodiments, the irregular nanoscale aggregates have an average particle diameter ranging from 30 to 130 nm, preferably 50 to 110 nm, preferably 60 to 100 nm, preferably 70 to 90 nm, preferably 75 to 80 nm. In a preferred embodiment, the irregular nanoscale aggregates have an average particle diameter of 74.19 nm.

In some embodiments, the nanocomposite material has an oxygen content in a range from 30 to 70 atomic % (at. %), preferably 40 to 60 at. %, preferably 45 to 65 at. %, preferably 50 to 60 at. %, preferably 55 to 60 at. %, preferably 45 to 55 at. % based on the total number of atoms in the nanocomposite material. In a preferred embodiment, the nanocomposite material has an oxygen content of 50.2% based on the total number of atoms in the nanocomposite material.

In some embodiments, the nanocomposite material has a silicon content in a range from 10 to 35 at. %, preferably 20 to 30 at. %, preferably 22 to 30 at. %, preferably 25 to 30 at. %, preferably 22 to 27 at. %, based on the total number of atoms in the nanocomposite material. In a preferred embodiment, the nanocomposite material has a silicon content of 24.4% based on the total number of atoms in the nanocomposite material.

In some embodiments, the nanocomposite material has a zinc content in a range from 5 to 25 at. %, preferably 8 to 18 at. %, preferably 10 to 18 at. %, preferably 15 to 18 at. %, preferably 10 to 15 at. %, based on the total number of atoms in the nanocomposite material. In a preferred embodiment, the nanocomposite material has a zinc content of 12.5% based on the total number of atoms in the nanocomposite material.

In some embodiments, the nanocomposite material has an iron content in a range from 2 to 15 at. %, preferably 5 to 10 at. %, preferably 7 to 10 at. %, preferably 8 to 10 at. %, preferably 6 to 9 at. %, based on the total number of atoms in the nanocomposite material. In a preferred embodiment, the nanocomposite material has an iron content of 7.3% based on the total number of atoms in the nanocomposite material.

In some embodiments, the nanocomposite material has a carbon content in a range from 0.1 to 25 at. %, preferably 0.5 to 10 at. %, preferably 1 to 10 at. %, preferably 5 to 10 at. %, preferably 2 to 8 at. %, based on the total number of atoms in the nanocomposite material. In a preferred embodiment, the nanocomposite material has a carbon content of 5.6% based on the total number of atoms in the nanocomposite material.

In one or more embodiments, the nanocomposite material has a $Zn_2SiO_4$ content in a range of 20 to 80 wt. %, a $ZnFe_2O_4$ content in a range from 10 to 50 wt. %, a $SiO_2$ content in a range from 5 to 25 wt. %, and a carbon content in a range from 1 to 20 wt. %, based on the total weight of the nanocomposite material.

In some embodiments, the nanocomposite material has an adsorption capacity for basic fuchsin dye of greater than or equal to 100 mg/g, preferably greater than or equal to 140 mg/g, preferably greater than or equal to 150 mg/g, preferably greater than or equal to 155 mg/g, preferably greater than or equal to 160 mg/g, preferably greater than or equal to 155 mg/g, preferably greater than or equal to 165 mg/g. In a preferred embodiment, the nanocomposite material has an adsorption capacity for basic fuchsin dye of 158.11 mg/g.

FIG. 1A illustrates a schematic flow chart of a method 50 of preparing the rhombohedral $Zn_2SiO_4$/cubic $ZnFe_2O_4$/hexagonal $SiO_2$/C nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding $NH_4OH$ gradually to a solution comprising $Zn(NO_3)_2 \cdot 6H_2O$, $Fe(NO_3)_3 \cdot 9H_2O$, and vinyltrimethoxysilane, forming a reaction mixture. In some embodiments, the base may include but is not limited to sodium hydroxide, potassium hydroxide, calcium hydroxide, lithium hydroxide, magnesium hydroxide, barium hydroxide, strontium hydroxide, sodium carbonate, potassium carbonate, calcium carbonate, sodium bicarbonate, potassium bicarbonate, ammonium carbonate, sodium acetate, potassium acetate, calcium acetate, sodium metasilicate, potassium metasilicate, ammonium carbonate, sodium phosphate, potassium phosphate, calcium phosphate, magnesium phosphate, sodium hydroxide solution, potassium hydroxide solution, sodium sulfate, potassium sulfate, ammonium sulfate, sodium nitrate, potassium nitrate, and sodium borate. In a preferred embodiment, the base is $NH_4OH$. In some embodiments, the concentration of $NH_4OH$ in the reaction mixture may range from 40 to 80 ml/L, preferably 50 to 70 ml/L, preferably 55 to 70 ml/L, preferably 60 to 70 ml/L, preferably 65 to 70 ml/L. In a preferred embodiment, the concentration of $NH_4OH$ is 60 ml/L.

Although a preferred embodiment uses $Zn(NO_3)_2 \cdot 6H_2O$ as the zinc salt, in some embodiments, the zinc salt may include but is not limited to zinc chloride, zinc acetate, zinc sulfate, zinc oxide, zinc carbonate, zinc nitrate, zinc bromide, zinc iodide, zinc sulfate heptahydrate, zinc chloride hexahydrate, zinc acetate dihydrate, zinc nitrate tetrahydrate, zinc thiocyanate, zinc formate, zinc methanesulfonate, zinc isothiocyanate, zinc citrate, zinc pyrophosphate, zinc orthophosphate, zinc laurate, zinc stearate, zinc benzoate, zinc salicylate, zinc hydroxide, zinc peroxysulfate, zinc tartrate, zinc lactate, zinc picrate, zinc gluconate, and zinc ascorbate. In some embodiments, the concentration of $Zn(NO_3)_2 \cdot 6H_2O$ in the reaction mixture may range from 60 to 120 g/L, preferably 80 to 100 g/L, preferably 85 to 100 g/L, preferably 90 to 100 g/L, preferably 95 to 100 g/L. In a preferred embodiment, the concentration of $Zn(NO_3)_2 \cdot 6H_2O$ is 93 g/L.

Although a preferred embodiment uses $Fe(NO_3)_3 \cdot 9H_2O$ as the iron salt, in some embodiments, the iron salt may include but is not limited to iron chloride, iron sulfate, iron acetate, iron phosphate, iron nitrate, iron oxide, iron oxalate, iron hydroxide, iron bromide, iron iodide, iron tartrate, iron lactate, iron citrate, iron pyrophosphate, iron benzoate, iron methanesulfonate, iron formate, iron methanearsonate, iron nitrate hexahydrate, iron dichloride, iron phosphate monohydrate, iron selenate, and iron acetylacetonate. In some embodiments, the concentration of $Fe(NO_3)_3 \cdot 9H_2O$ in the reaction mixture may range from 90 to 160 g/L, preferably 110 to 140 g/L, preferably 115 to 140 g/L, preferably 120 to 140 g/L, preferably 125 to 140 g/L, preferably 130 to 140 g/L, preferably 135 to 140 g/L. In a preferred embodiment, the concentration of $Fe(NO_3)_3 \cdot 9H_2O$ is 126 g/L.

In some embodiments, the silane coupling agent may include, but is not limited to, aminopropyltriethoxysilane, mercaptopropyltrimethoxysilane, propyltrimethoxysilane, octyltrimethoxysilane, methyltriethoxysilane, phenyltrimethoxysilane, butyltrimethoxysilane, chloroalkylsilane, epoxy-functional silane, isocyanatopropyltriethoxysilane, glycidoxypropyltrimethoxysilane, chloropropyltriethoxysilane, N-phenylaminopropyltrimethoxysilane, methacryloxypropyltrimethoxysilane, vinyltriethoxysilane, vinyltriacetoxysilane, trimethoxysilane, vinyltrichlorosilane, cyclohexyltrimethoxysilane, n-octyltriethoxysilane, perfluorooctyltrichlorosilane, tetraethoxysilane, tetraethoxysilane (TEOS), and 3-glycidyloxypropyltrimethoxysilane. In a preferred embodiment, silane coupling agent is vinyltrimethoxysilane. In some embodiment, the concentration of vinyltrimethoxysilane in the reaction mixture may range from 100 to 600 ml/L, preferably 300 to 500 ml/L, preferably 350 to 500 ml/L, preferably 400 to 500 ml/L, preferably 450 to 500 ml/L. In a preferred embodiment, the concentration of vinyltrimethoxysilane is 400 ml/L.

At step 54, the method 50 includes stirring the reaction mixture for 1 h, forming a gel-like precipitate. In some embodiment, the reaction mixture may be stirred for 0.25 to 4 hours, preferably 0.5 to 2 hours, preferably 1 to 2 hours, preferably 1.5 to 2 hours, preferably 1.75 to 2 hours. In a preferred embodiment, the reaction mixture is stirred for 1 hour.

At step 56, the method 50 includes filtering and washing the gel-like precipitate with distilled water to form a washed precipitate. In some embodiments, the gel-like precipitate may be washed with, but is not limited to, deionized water, ethanol, isopropanol, acetone, methanol, hexane, toluene, chloroform, acetone-water mixture, ethanol-water mixture, butanol, diethyl ether, tetrahydrofuran, acetonitrile, dimethyl sulfoxide, water-acetone mixture, saline solution, sodium chloride solution, potassium chloride solution, hydrochloric acid solution, sodium bicarbonate solution, sodium hydroxide solution, phosphoric acid solution, sodium phosphate solution, hydrochloric acid-ethanol solution, acetone-ethanol solution, or a mixture of organic solvents like acetone-toluene or ethanol-isopropanol. In a preferred embodiment, the gel-like precipitate is washed with distilled water.

At step 58, the method 50 includes drying the washed precipitate at 80 to 120° C., preferably 100° C. to form a dried precipitate. In some embodiments, the washed precipitate is dried with, but is not limited to, hot air, oven drying, vacuum drying, freeze-drying, air-drying, desiccator drying, rotary evaporator, infrared drying, microwave drying, thermal drying, nitrogen gas flow, silica gel, phosphorus pentoxide, molecular sieves, calcium chloride, activated alumina, superheated steam, forced air, low-temperature drying, freeze-drying under vacuum, ultrasonic drying, convective drying, and dehumidified air.

At step 60, the method 50 includes calcining the dried precipitate at a temperature in a range from 600 to 800° C. for 1 to 5 hours to form the rhombohedral $Zn_2SiO_4$/cubic $ZnFe_2O_4$/hexagonal $SiO_2$/C nanocomposite material. In some embodiments, the dried precipitate is calcined at a temperature in a range from 600 to 800° C., preferably 650 to 800° C., preferably 700 to 800° C., preferably 750 to 800° C., preferably 650 to 750° C. In a preferred embodiment, the dried precipitate is calcined at 700° C. In some embodiment, the dried precipitate is calcined for 1 to 5 hours, preferably 1.5 to 5 hours, preferably 2 to 5 hours, preferably 2.5 to 5 hours, preferably 3 to 5 hours, preferably 3.5 to 5 hours, preferably 4 to 5 hours, preferably 4.5 to 5 hours, preferably 2 to 4 hours. In a preferred embodiment, the dried precipitate is calcined for 3 hours.

The following examples are provided solely for illustration and are not to be construed as limitations of the present disclosure, as many variations thereof are possible without departing from the spirit and scope of the present disclosure.

EXAMPLES

The following examples demonstrate a rhombohedral $Zn_2SiO_4$/cubic $ZnFe_2O_4$/hexagonal $SiO_2$/C nanocomposite material and a method of preparation thereof. The examples are provided solely for illustration and are not to be construed as limitations of the present disclosure, as many variations thereof are possible without departing from the spirit and scope of the present disclosure.

Example 1: Synthesis of Rhombohedral $Zn_2SiO_4$/Cubic $ZnFe_2O_4$/Hexagonal $SiO_2$/C Nanocomposite In the first step, 23.24 grams (g) of zinc nitrate hexahydrate $(Zn(NO_3)_2 \cdot 6H_2O)$, 31.56 g of ferric nitrate nonahydrate $(Fe(NO_3)_3 \cdot 9H_2O)$, and 100 mL of vinyltrimethoxysilane were dissolved in 100 mL of distilled water (DW). Subsequently, 50 mL of 30% ammonium hydroxide $(NH_4OH)$ was gradually added to the mixture under continuous stirring for 1 hour, promoting the formation of a gel-like precipitate. The gel-like precipitate was filtered, thoroughly washed with distilled water, and dried at 100° C. Finally, the dried precipitate was calcined at 700° C. for 3 hours to yield the $Zn_2SiO_4$/cubic $ZnFe_2O_4$/hexagonal $SiO_2$/C nanocomposite. FIG. 1B illustrates the synthesis of the rhombohedral $Zn_2SiO_4$/cubic $ZnFe_2O_4$/hexagonal $SiO_2$/C nanocomposite using the sol-gel method.

Example 2: Characterization

Figure 2:
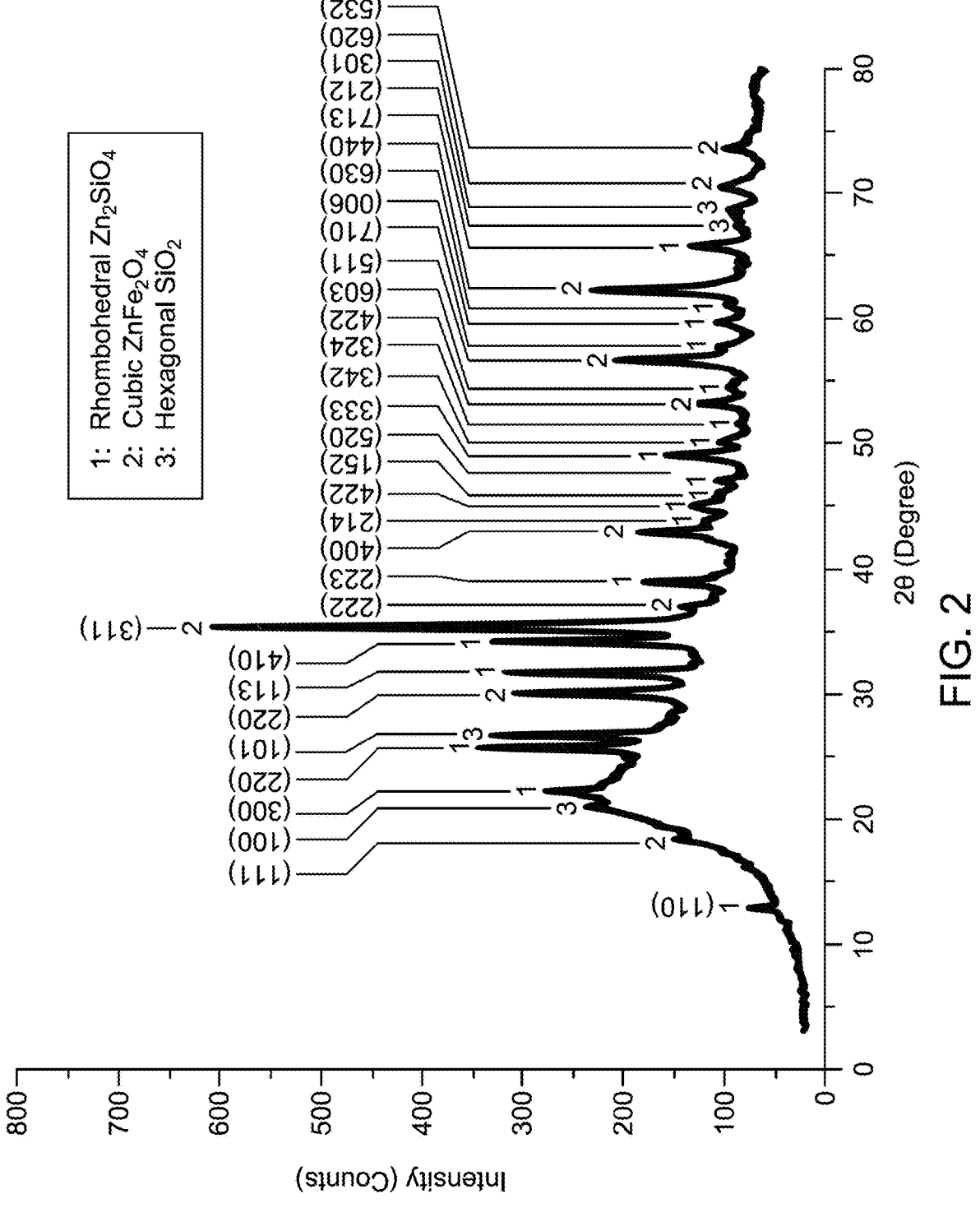
FIG. 2 shows X-ray diffraction (XRD) pattern of the nanocomposite material, according to certain embodiments.

The X-ray diffraction (XRD) pattern, as shown in FIG. 2 corresponds to the synthesized nanocomposite. The analysis confirmed the presence of three crystalline phases: rhombohedral $Zn_2SiO_4$ (zinc silicate), cubic $ZnFe_2O_4$ (zinc ferrite), and hexagonal $SiO_2$ (silicon oxide). These phases were identified using the standard reference cards JCPDS (No. 00-008-0492), JCPDS (No. 01-074-2397), and COD (No. 5000035), respectively. The rhombohedral $Zn_2SiO_4$ phase exhibited diffraction peaks at 2θ° values of 12.80°, 22.14°, 25.59°, 31.57°, 34.09°, 38.92°, 43.65°, 44.91°, 45.75°, 47.01°, 48.99°, 50.05°, 51.42°, 54.46°, 57.60°, 59.59°, 60.96°, and 65.68°, corresponding to the Miller indices (110), (300), (220), (113), (410), (223), (214), (422), (152), (520), (333), (342), (324), (603), (710), (006), (630), and (713), respectively. The cubic $ZnFe_2O_4$ phase displayed diffraction peaks at 2θ° values of 18.15°, 29.89°, 35.35°, 36.83°, 42.92°, 53.19°, 56.65°, 62.22°, 70.52°, and 73.56°, corresponding to the Miller indices (111), (220), (311), (222), (400), (422), (511), (440), (620), and (533), respectively. The hexagonal $SiO_2$ phase exhibited diffraction peaks at 2θ° values of 20.87°, 26.65°, 67.25°, and 68.51°, corresponding to the Miller indices (100), (101), (212), and (301), respectively. The average crystallite size of the synthesized nanocomposite was 58.82 nm. These structural and crystallographic properties, listed in Table 1.

TABLE 1

Structural and crystallographic properties of the synthesized nanocomposite components.

| | Components of synthesized nanocomposite | | | Average crystallite size of synthesized nanocomposite |
|---|---|---|---|---|
| Phase | Chemical name | Card No. | Crystal system | (nm) |
| $Zn_2SiO_4$ | Zinc silicate | JCPDS-00-008-0492 | Rhombohedral | 58.82 |
| $ZnFe_2O_4$ | Zinc ferrite | JCPDS-01-074-2397 | Cubic | |
| $SiO_2$ | Silicon oxide | COD-5000035 | Hexagonal | |

Figure 3:
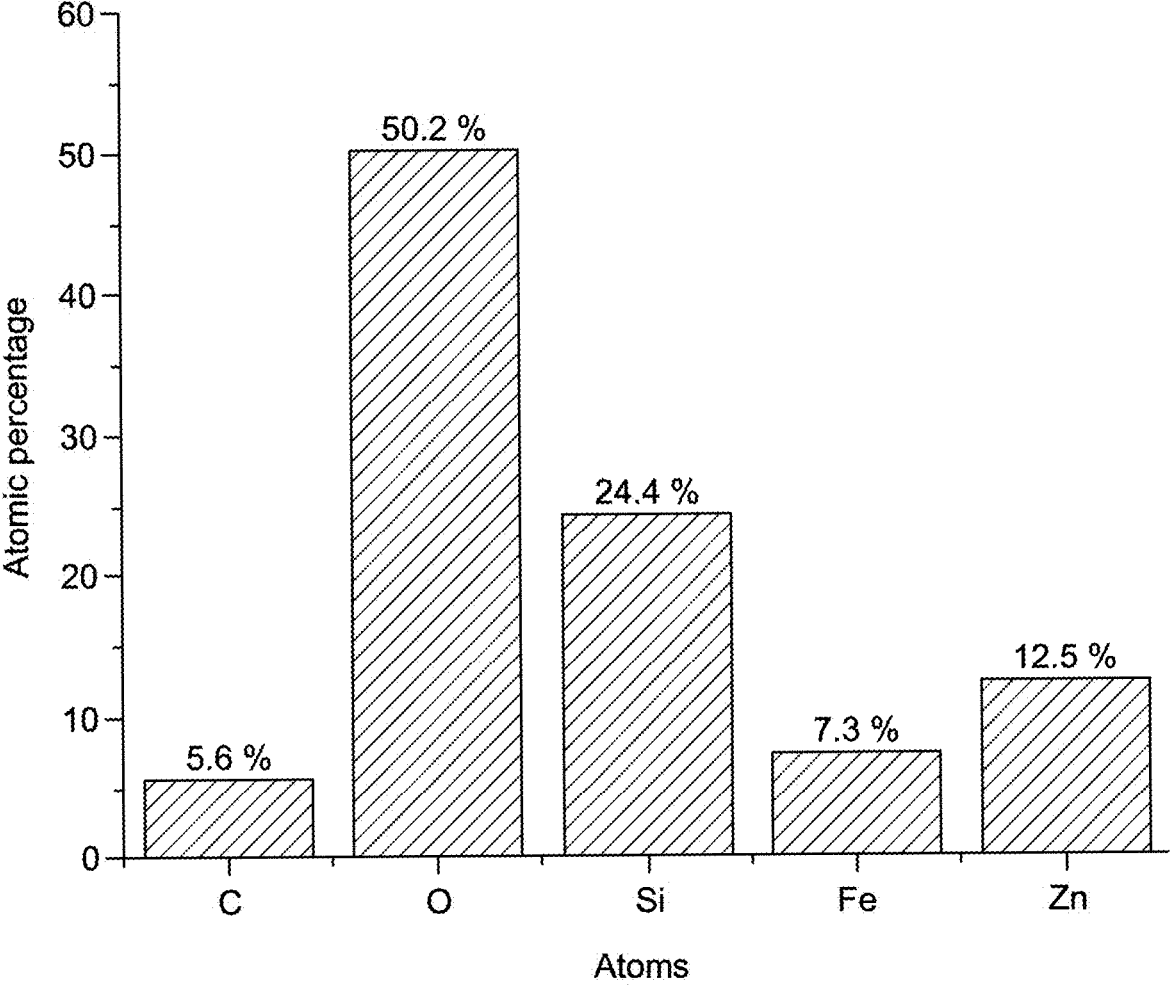
FIG. 3 depicts atomic percentage distribution of elements determined by energy dispersive X-ray spectroscopy (EDX) for the nanocomposite material, according to certain embodiments.

The elemental composition of the synthesized nanocomposite was determined by energy dispersive X-ray spectroscopy (EDX), as shown in FIG. 3. The analysis revealed the presence of carbon (C), oxygen (O), silicon (Si), iron (Fe), and zinc (Zn) with atomic percentages of 5.6 at. %, 50.2 at. %, 24.4 at. %, 7.3 at. %, and 12.5 at. %, respectively. The high oxygen content indicates it is a major constituent in the oxide phases of the nanocomposite. Silicon and zinc were integrated as components of the $Zn_2SiO_4$ phase, whereas iron and zinc contributed to the $ZnFe_2O_4$ phase. The presence of carbon was attributed to the use of vinyltrimethoxysilane in the sol-gel synthesis method, where it functioned as a precursor, leaving residual carbon in the final product. The observed elemental composition confirmed the successful synthesis of the nanocomposite with its intended constituents.

Figure 4:
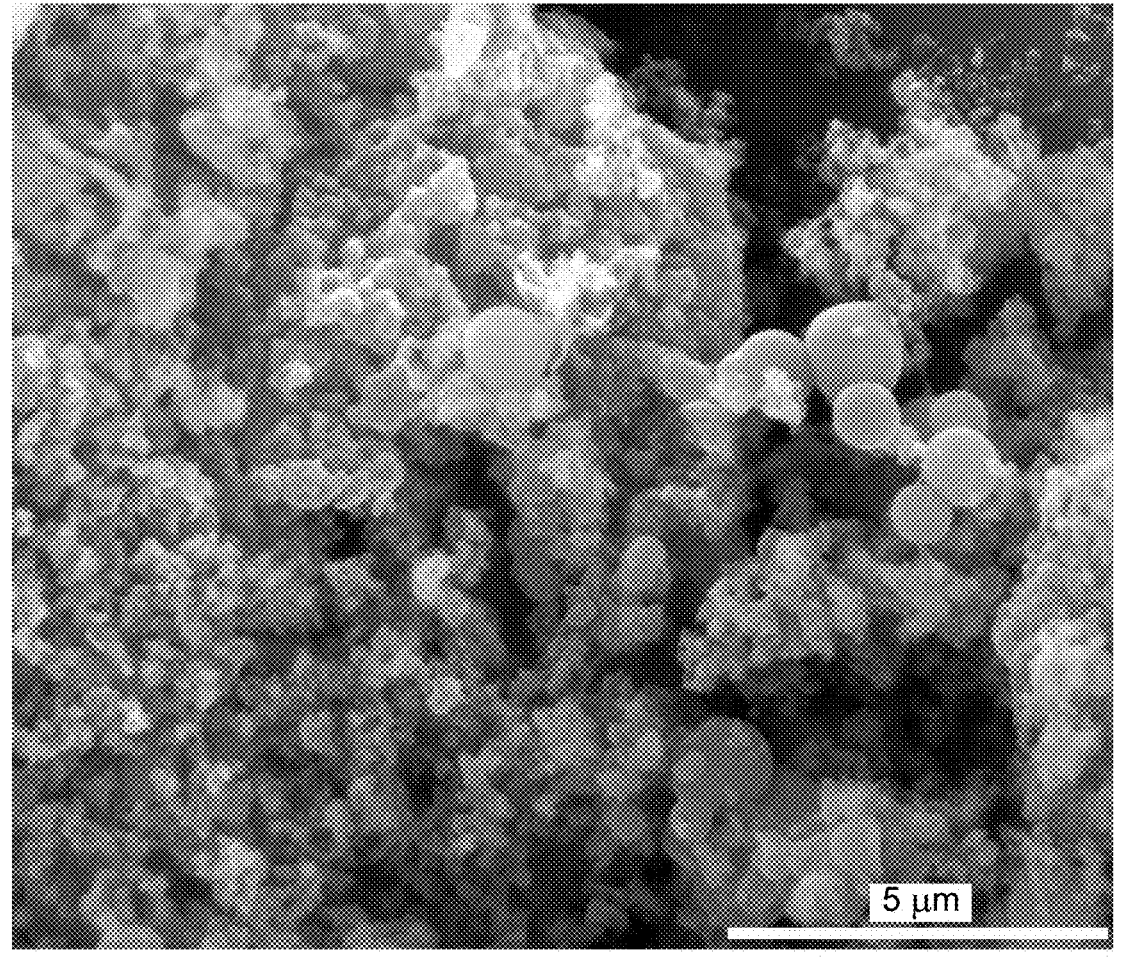
FIG. 4 shows scanning electron microscope (SEM) image of the nanocomposite material, according to certain embodiments.

Further, the scanning electron microscope (SEM) image of the synthesized nanocomposite, highlighting its morphological features, is shown in FIG. 4. The image revealed a heterogeneous surface with a combination of spherical particles and irregularly shaped aggregates. The spherical structures were likely attributed to the nucleation and growth of $Zn_2SiO_4$ and $ZnFe_2O_4$ phases, while the irregular aggregates showed the interconnected and compact arrangement of silicon oxide and other matrix components. This morphology indicated a successful synthesis process, with distinct structural characteristics that enhance the surface area and make the material suitable for applications such as adsorption or catalysis.

Figure 5A:
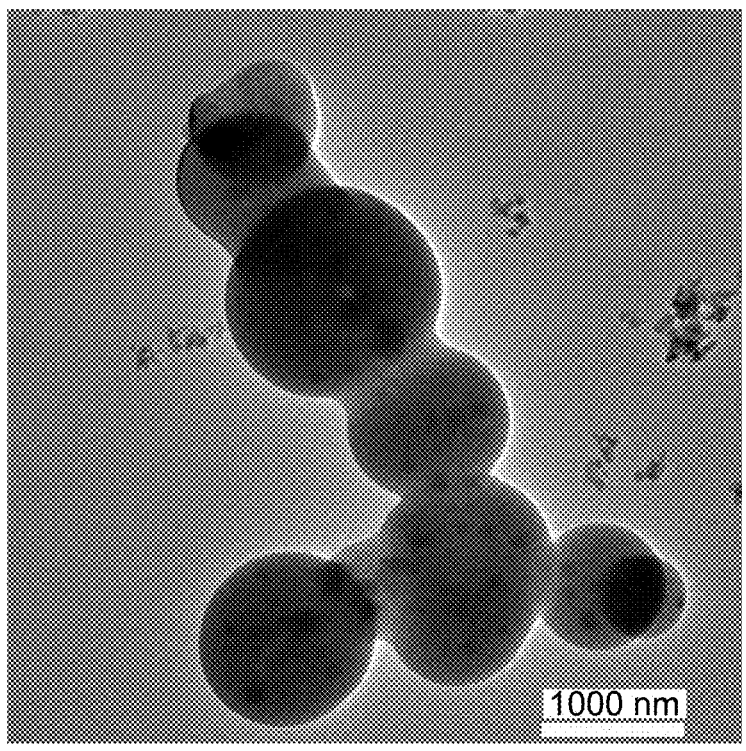
FIG. 5A shows a high-resolution transmission electron microscopy (HR-TEM) image of the nanocomposite material sample showing interconnected spherical nanoparticles with sizes in the nanometer range, according to certain embodiments.
Figure 5B:
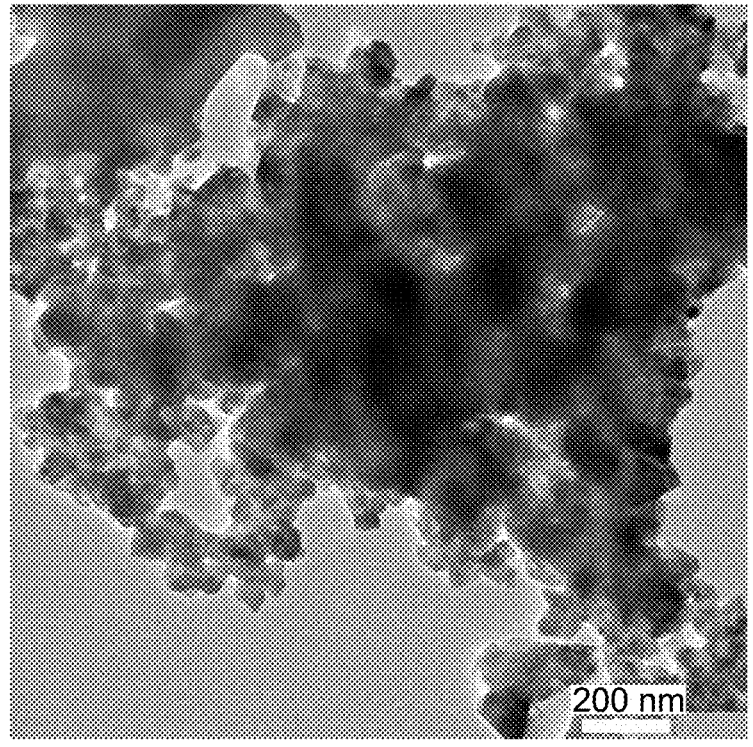
FIG. 5B shows HR-TEM image of the nanocomposite material depicting densely packed aggregated nanostructures, highlighting the uniformity and morphology of the material, according to certain embodiments.

As shown in FIGS. 5A-5B, high-resolution transmission electron microscopy (HRTEM) images depict distinct morphological features of the synthesized nanocomposite sample. In FIG. 5A, interconnected spherical particles were observed, with an average particle diameter of 1.19 µm. These structures exhibited a well-defined spherical morphology, indicative of controlled growth during synthesis. In FIG. 5B, densely packed aggregated nanostructures were visible with an average particle diameter of 79.14 nm. These smaller particles formed irregularly shaped clusters, contributing to the overall high surface area of the material. The combination of spherical nanoparticles and aggregated nanostructures highlighted the material's exceptional morphology and provided insights into its potential applications in areas such as adsorption or catalysis.

Example 3: Adsorption of Basic Fuchsin Dye (BF)

Further, the present disclosure includes adsorption measurements. The quantity of around 0.05 g of sorbent was measured in a separate 150 mL beaker. Then, 100 mL of the 100 mg $L^{-1}$ BF solution was poured into each beaker. A portion of the mixture was withdrawn till the BF sorption reached equilibrium. The aliquots were filtered via a 0.22 µm syringe filter, and the absorbance was measured utilizing a UV-Vis (ultraviolet-visible) spectrophotometer ($\lambda$=550 nm).

The contact time research of BF and sorption onto the as-prepared nanocomposite was experimented. The BF and absorbance measured during the examination were employed for calculating their remaining unadsorbed concentrations at each time interval via equation 1. Equation 2 was utilized to calculate the adsorption capacity at each period, where, the BF or milligrams adsorbed onto one gram of sorbent, $q_t$, mg $g^{-1}$.

$$C_t = \frac{Absorbance_{sample}}{Absorbance_{standard}} \times conc._{standard} \tag{1}$$

$$q_t = \frac{(C_o - C_t)V}{m}, \tag{2}$$

Figures 6, 7:
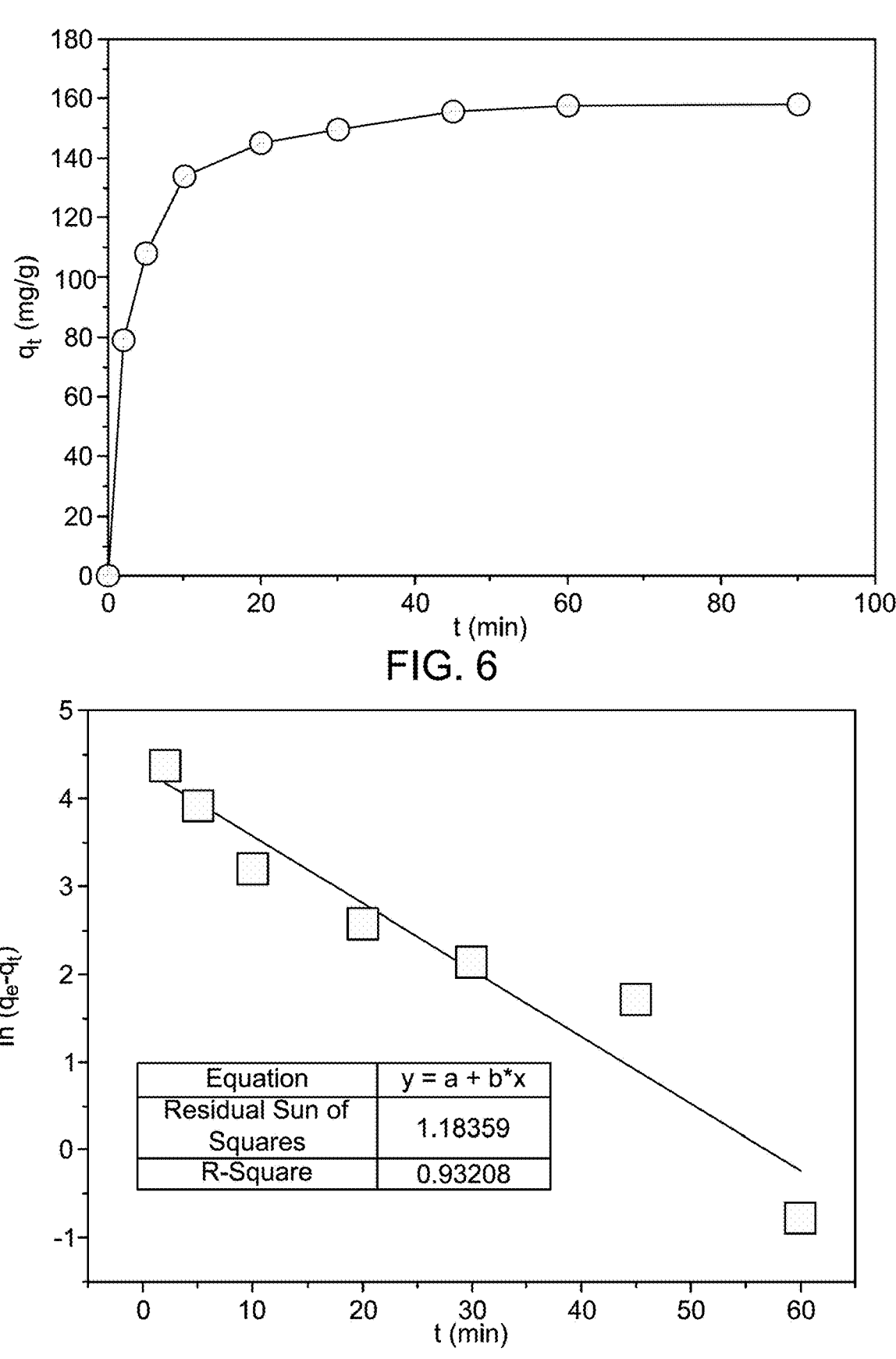
FIG. 6 depicts the contact time investigation of basic fuchsin dye (BF) sorption onto the nanocomposite material, according to certain embodiments.
FIG. 7 depicts the pseudo-first order (PF) examination of BF sorption onto the nanocomposite material, according to certain embodiments.

FIG. 6 demonstrated the adsorption trend of BF onto prepared nanocomposite. The $Zn_2SiO_4/ZnFe_2O_4/SiO_2/C$ showed $q_t$ values of 158.1, these findings reflected the high sorption ability of the $Zn_2SiO_4/ZnFe_2O_4/SiO_2/C$. Notably, almost 90% of the gained $q_t$ value was acquired within the first 20 minutes, and the overall sorption processes reached equilibrium within 60 minutes, presenting the $Zn_2SiO_4/ZnFe_2O_4/SiO_2/C$ as fast treatment sorbent.

Example 4: Adsorption Rate Order

The adsorption rate order of BF removal by $Zn_2SiO_4/ZnFe_2O_4/SiO_2/C$ was examined via pseudo-first-order (PF, equation. 3) and pseudo-second-order (PS, equation. 4) kinetic models.

$$\ln(q_e - q_t) = \ln q_e - k_1 \cdot t \tag{3}$$

$$\frac{1}{q_t} = \frac{1}{k_2 \cdot q_e^2 t} + \frac{1}{q_e} \tag{4}$$

Figure 8:
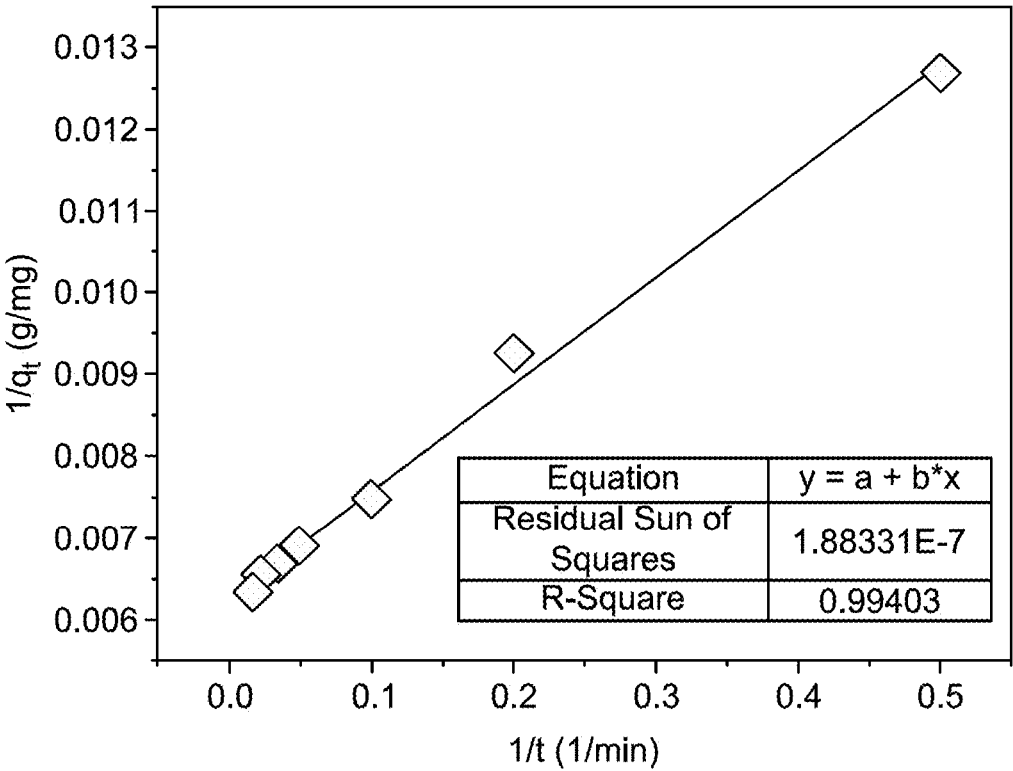
FIG. 8 depicts the PS examination of BF sorption onto the nanocomposite material, according to certain embodiments.

The symbol $q_e$ (mg/g) represents the equilibrium adsorption capacity. The PF and PS constants were also time-dependent, with the former represented as k1 ($min^{-1}$) and the latter as k2 (g $mg^{-1}$ $min^{-1}$). The PF plot of the BF adsorption onto $Zn_2SiO_4/ZnFe_2O_4/SiO_2/C$ nanocomposite, as shown in FIG. 7. Additionally, FIG. 8 shows the PS plots of BF sorption onto $Zn_2SiO_4/ZnFe_2O_4/SiO_2/C$. The rate-order output of BF removal, shown in Table 2, listing that the sorption on $Zn_2SiO_4/ZnFe_2O_4/SiO_2/C$ showed a better fit to the PS model.

TABLE 2

The adsorption rate order and rate control results of BF removal.

| Sorption rate order | PFO | | PSO | |
|---|---|---|---|---|
| qe exp. (mg $g^{-1}$) | $R^2$ | $k_1$ | $R^2$ | $k_2$ |
| 158.11 | 0.9321 | 0.0758 | 0.9940 | 0.00299 |
| Sorption rate | LFDM | | IPDM | |
| control mechanism | $K_{LF}$ ($min^{-1}$) | $R^2$ | $K_{IP}$ (mg $g^{-1}$ $min^{0.5}$) | $R^2$ |
| | 0.076 | 0.932 | 11.026 | 0.803 |

Example 5: Adsorption Control Mechanism

The rate-control mechanism of BF removal by $Zn_2SiO_4/ZnFe_2O_4/SiO_2/C$ was examined using the intraparticle (IPD, equation. 5) and the liquid-film (LFD, equation. 6) diffusion model.

$$q_t = K_{IP} * t^{\frac{1}{2}} + C_i \tag{5}$$

$$\ln(1 - F) = -K_{LF} * t \tag{6}$$

The IPD constant was denoted by $K_{IPD}$ (mg $g^{-1}$ $min^{-1/2}$), and the LFD constant was designated by $K_{LFD}$ ($min^{-1}$). C; is the boundary layer factor, expressed as mg $g^{-1}$.

Figure 9:
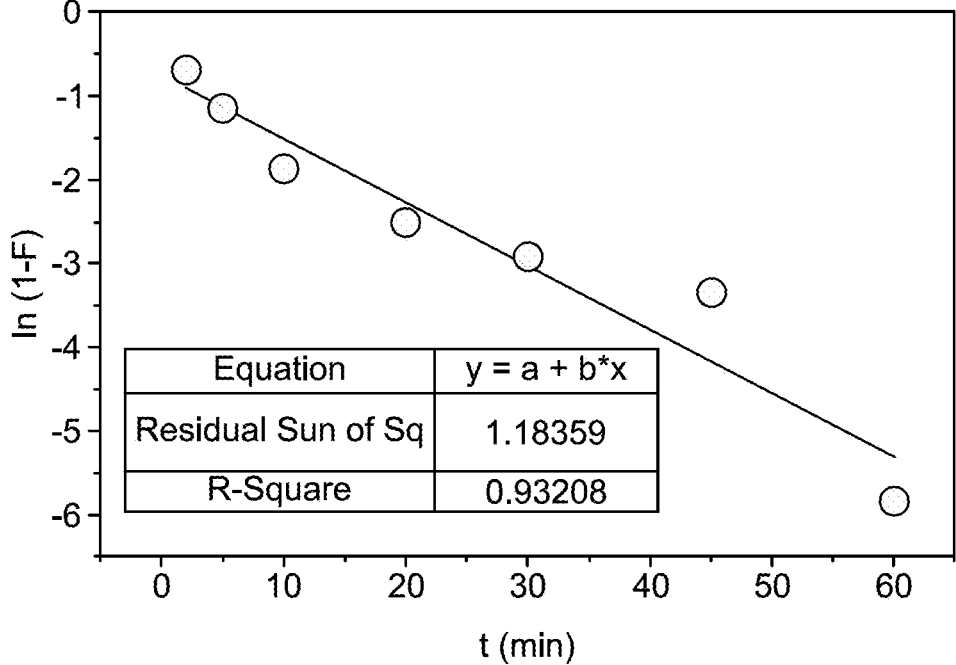
FIG. 9 depicts the liquid film (LFD) examination of BF sorption onto the nanocomposite material, according to certain embodiments.
Figure 10:
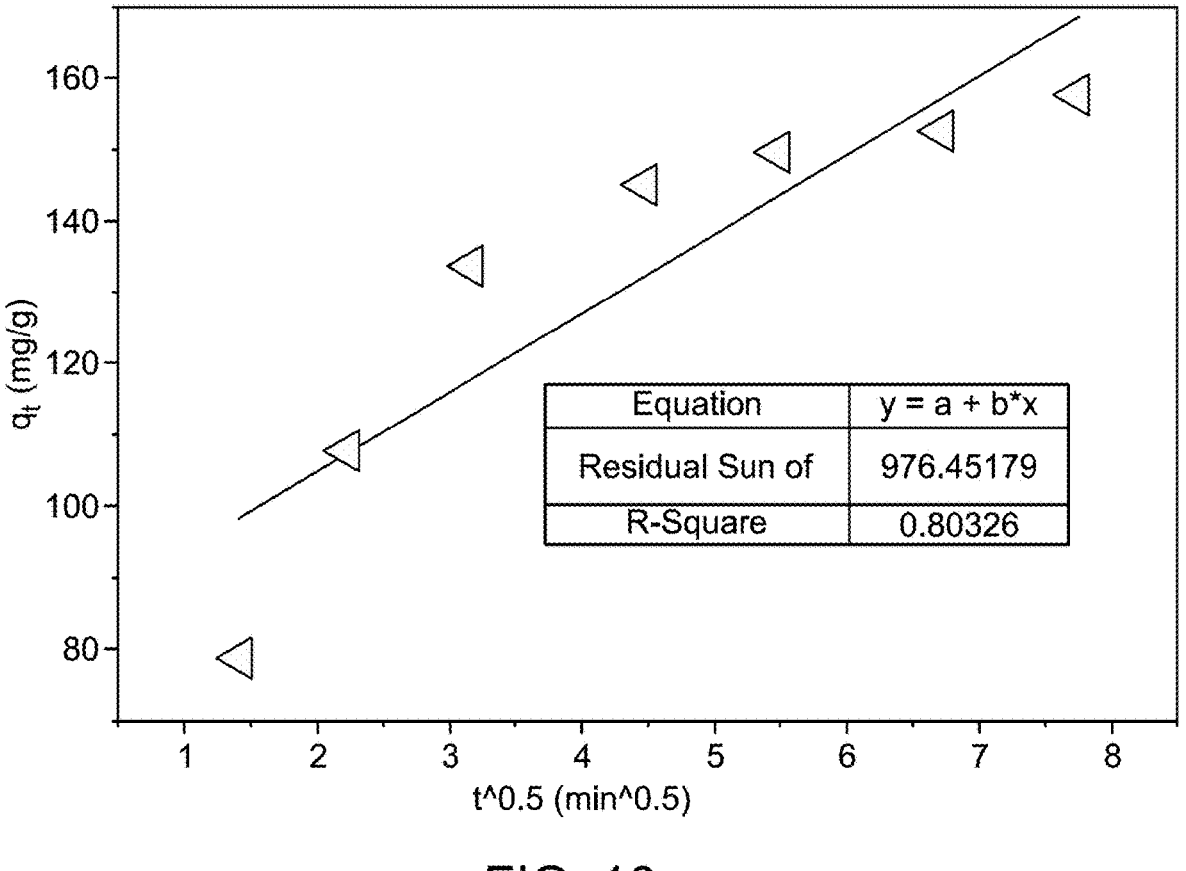
FIG. 10 depicts the intraparticle diffusion (IPD) examination of BF sorption onto the nanocomposite material, according to certain embodiments.

The LFD plot of the BF adsorption onto $Zn_2SiO_4/ZnFe_2O_4/SiO_2/C$ nanocomposite, as shown in FIG. 9. Additionally, FIG. 10 illustrates the IPD plots of BF sorption onto $Zn_2SiO_4/ZnFe_2O_4/SiO_2/C$. The rate-control output of BF removal, as listed in Table 2, illustrated that the LF controlled the sorption on $ZnAl_2O_4$, indicating a high affinity for BF toward the fabricated $Zn_2SiO_4/ZnFe_2O_4/SiO_2/C$ nanocomposite The aspects of the present disclosure address several limitations found in existing technologies and processes for synthesizing multi-phase nanocomposites. Traditional methods often suffer from high energy demands, complex synthesis routes, and limited control over the resultant material's structure and composition, which hinders their scalability and applicability. The present disclosure introduces a facile sol-gel synthesis of a novel rhombohedral $Zn_2SiO_4$/cubic $ZnFe_2O_4$/hexagonal $SiO_2$/C nanocomposite, overcoming these challenges by employing a straightforward and cost-effective process. The method enables precise control over the morphology and crystallinity of the nanocomposite, as demonstrated by the presence of uniformly sized particles and enhanced structural stability, validated through advanced characterization techniques. The incorporation of carbon, facilitated by using vinyltrimethoxysilane as a precursor, enhances the functional properties of the material while maintaining structural integrity. The synthesis technique not only reduces process complexity and energy requirements but also results in a material with optimized properties, making it highly suitable for applications in environmental remediation and advanced material science. The present disclosure effectively bridges the gap by providing a sustainable and efficient solution to the challenges in multi-component nanocomposite synthesis.

According to the present disclosure, the synthesized rhombohedral $Zn_2SiO_4$, cubic $ZnFe_2O_4$/hexagonal $SiO_2$/C nanocomposite, obtained through a sol-gel method, represents an advancement in multi-phase nanomaterials. XRD analysis confirmed the presence of three distinct crystalline phases, rhombohedral $Zn_2SiO_4$, cubic $ZnFe_2O_4$, and hexagonal $SiO_2$, with an average crystallite size of 58.82 nm, indicative of high structural integrity and phase purity. SEM analysis revealed a combination of spherical particles and irregularly shaped aggregates, indicating the formation of a heterogeneous and interconnected structure. HRTEM further confirmed spherical particles with an average diameter of 1.19 μm and densely packed aggregated nanostructures averaging 79.14 nm, demonstrating controlled growth and morphology. EDX analysis identified the elemental composition, showing atomic percentages of 5.6% carbon, 50.2% oxygen, 24.4% silicon, 7.3% iron, and 12.5% zinc, with carbon incorporation coming from vinyltrimethoxysilane used during synthesis. The disclosed nanocomposite integrates multiple functional phases through a simple and cost-effective fabrication process, offering distinct structural properties and broad application potential.

The synthesized rhombohedral $Zn_2SiO_4$/cubic $ZnFe_2O_4$/ hexagonal $SiO_2$/C nanocomposite has potential applications in environmental remediation, particularly for removing heavy metals and organic pollutants from aqueous media. The multi-phase nanocomposite composition and enhanced structural properties make it suitable for use in advanced sensors and catalytic systems for industrial processes. Additionally, the material's thermal stability and electrical properties suggest potential use in energy storage devices and as a component in electronic applications.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A rhombohedral $Zn_2SiO_4$/cubic $ZnFe_2O_4$/hexagonal $SiO_2$/C nanocomposite material, comprising:
   a rhombohedral $Zn_2SiO_4$ phase;
   a cubic $ZnFe_2O_4$ phase; and
   a hexagonal $SiO_2$ phase,
   wherein the rhombohedral $Zn_2SiO_4$/cubic $ZnFe_2Oz$/hexagonal $SiO_2$/C nanocomposite material has a morphology comprising spherical microscale particles with an average diameter in a range from 0.8 to 1.8 μm and irregular nanoscale aggregates with an average diameter in a range from 50 to 110 nm, and
   wherein rhombohedral $Zn_2SiO_4$/cubic $ZnFe_2O_4$/hexagonal $SiO_2$/C nanocomposite material has an adsorption capacity for basic fuchsin dye of greater than or equal to 140 mg/g,
   wherein the oxygen content is in a range from 40 to 60 atomic % (at. %), the silicon content is in a range from 20 to 30 at. %, the zinc content is in a range from 8 to 18 at. %, the iron content is in a range from 5 to 10 at. %, and the carbon content is in a range from 0.5 to 10 at. %.

2. The rhombohedral $Zn_2SiO_4$/cubic $ZnFe_2O_4$/hexagonal $SiO_2$/C nanocomposite material of claim 1, wherein the spherical microscale particles with an average diameter in a range from 1 to 1.5 μm.

3. The rhombohedral $Zn_2SiO_4$/cubic $ZnFe_2O_4$/hexagonal $SiO_2$/C nanocomposite material of claim 2, wherein the spherical microscale particles with an average diameter in a range from 1.1 to 1.3 μm.

4. The rhombohedral $Zn_2SiO_4$/cubic $ZnFe_2Oz$/hexagonal $SiO_2$/C nanocomposite material of claim 1, wherein the irregular nanoscale aggregates with an average diameter in a range from 60 to 100 nm.

5. The rhombohedral $Zn_2SiO_4$/cubic $ZnFe_2O_4$/hexagonal $SiO_2$/C nanocomposite material of claim 4, wherein the irregular nanoscale aggregates with an average diameter in a range from 70 to 90 nm.

6. The rhombohedral $Zn_2SiO_4$/cubic $ZnFe_2O_4$/hexagonal $SiO_2$/C nanocomposite material of claim 1, wherein the rhombohedral $Zn_2SiO_4$/cubic $ZnFe_2O_4$/hexagonal $SiO_2$/C nanocomposite material has an average crystallite size in a range from 50 to 70 nm.

7. The rhombohedral $Zn_2SiO_4$/cubic $ZnFe_2O_4$/hexagonal $SiO_2$/C nanocomposite material of claim 6, wherein the rhombohedral $Zn_2SiO_4$/cubic $ZnFe_2O_4$/hexagonal $SiO_2$/C nanocomposite material has an average crystallite size in a range from 55 to 65 nm.

8. The rhombohedral $Zn_2SiO_4$/cubic $ZnFe_2O_4$/hexagonal $SiO_2$/C nanocomposite material of claim 1, wherein rhombohedral $Zn_2SiO_4$/cubic $ZnFe_2O_4$/hexagonal $SiO_2$/C nanocomposite material has an adsorption capacity for basic fuchsin dye of greater than or equal to 150 mg/g.

9. The rhombohedral $Zn_2SiO_4$/cubic $ZnFe_2O_4$/hexagonal $SiO_2$/C nanocomposite material of claim 8, wherein rhombohedral $Zn_2SiO_4$/cubic $ZnFe_2O_4$/hexagonal $SiO_2$/C nanocomposite material has an adsorption capacity for basic fuchsin dye of greater than or equal to 155 mg/g.

10. A rhombohedral $Zn_2SiO_4$/cubic $ZnFe_2O_4$/hexagonal $SiO_2$/C nanocomposite material, comprising:
   a rhombohedral $Zn_2SiO_4$ phase;
   a cubic $ZnFe_2O_4$ phase; and
   a hexagonal $SiO_2$ phase,
   wherein the rhombohedral $Zn_2SiO_4$/cubic $ZnFe_2O_4$/hexagonal $SiO_2$/C nanocomposite material has a morphology comprising spherical microscale particles with an average diameter in a range from 0.8 to 1.8 μm and irregular nanoscale aggregates with an average diameter in a range from 50 to 110 nm, and wherein rhombohedral $Zn_2SiO_4$/cubic $ZnFe_2O_4$/hexagonal $SiO_2$/C nanocomposite material has an adsorption capacity for basic fuchsin dye of greater than or equal to 140 mg/g, wherein the oxygen content is in a range from 45 to 55 atomic % (at. %), the silicon content is in a range from 22 to 27 at. %, the zinc content is in a range from 10 to 15 at. %, the iron content is in a range from 6 to 9 at. %, and the carbon content is in a range from 2 to 8 at. %.

11. A method of producing the rhombohedral $Zn_2SiO_4$/cubic $ZnFe_2O_4$/hexagonal $SiO_2$/C nanocomposite material of claim 1, comprising:

adding $NH_4OH$ to a solution comprising $Zn(NO_3)_2 \cdot 6H_2O$, $Fe(NO_3)_3 \cdot 9H_2O$, and vinyltrimethoxysilane, forming a reaction mixture;

stirring the reaction mixture for 1 h, forming a gel precipitate;

filtering and washing the gel precipitate with distilled water to form a washed precipitate;

drying the washed precipitate at 100° C. to form a dried precipitate; and calcining the dried precipitate at a temperature in a range from 600° C. to 800° C. for 1 to 5 hours to form the rhombohedral $Zn_2SiO_4$/cubic $ZnFe_2O_4$/hexagonal $SiO_2$/C nanocomposite material.

12. The method of claim 11, wherein the concentration of $NH_4OH$ in the reaction mixture is in a range from 50 to 70 ml/L.

13. The method of claim 11, wherein the concentration of $Zn(NO_3)_2 \cdot 6H_2O$ in the reaction mixture is in a range from 80 to 100 g/L.

14. The method of claim 11, wherein the concentration of $Fe(NO_3)_3 \cdot 9H_2O$ in the reaction mixture is in a range from 110 to 140 g/L.

15. The method of claim 11, wherein the concentration of vinyltrimethoxysilane in the reaction mixture is in a range from 300 to 500 ml/L.

16. The method of claim 11, wherein the dried precipitate is calcined at 650° C. to 750° C.

17. The method of claim 16, wherein the dried precipitate is calcined at 700° C.

18. The method of claim 11, wherein the dried precipitate is calcined for 2 to 4 hours.

19. The method of claim 11, wherein the dried precipitate is calcined for 3 hours.

* * * * *